United States Patent Office.

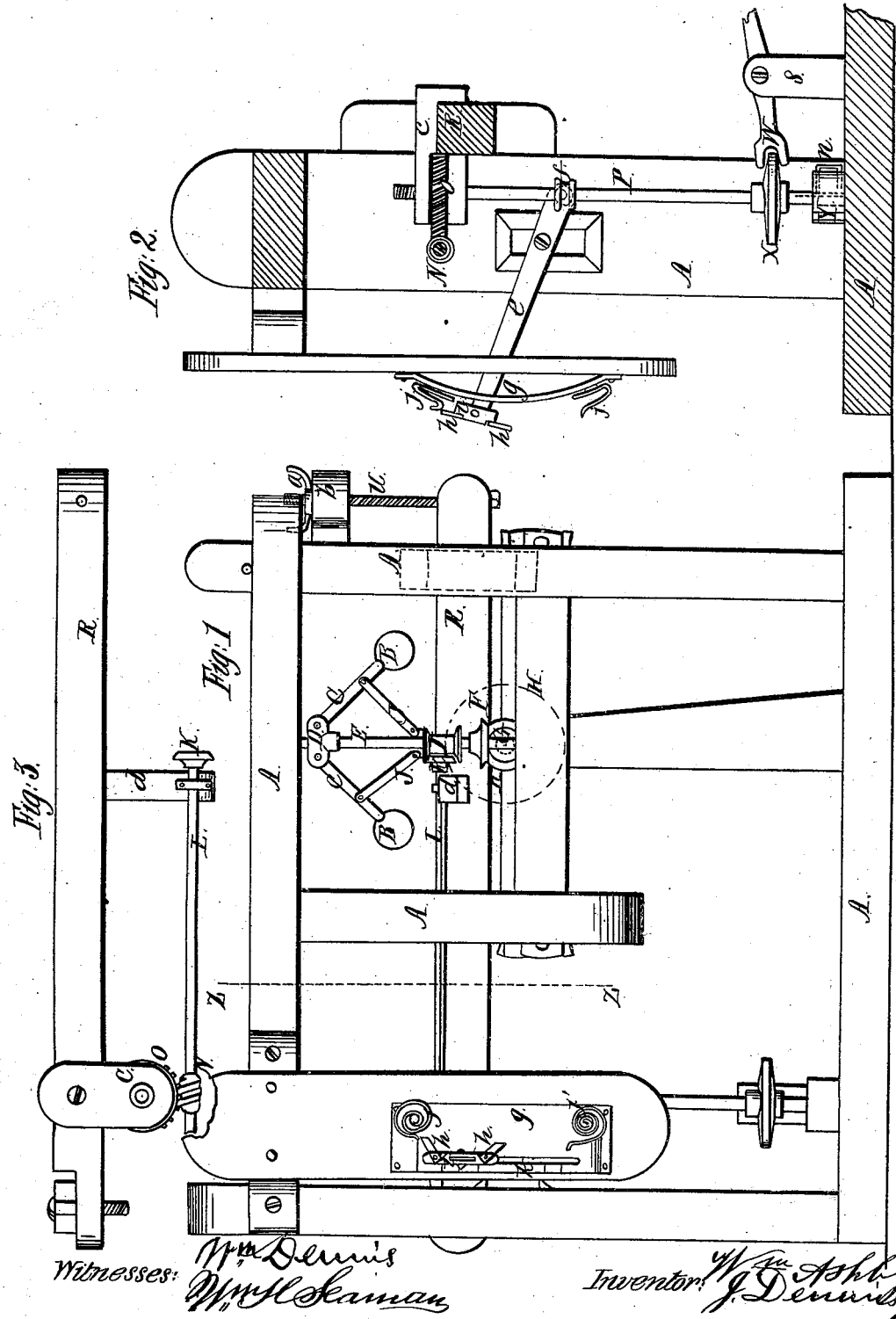

WILLIAM ASHBY, OF TIMBER TOWNSHIP, ASSIGNOR TO WARNER B. CARUTHERS, OF INDIAN POINT, ILLINOIS.

Letters Patent No. 85,632, dated January 5, 1869.

---

IMPROVEMENT IN STEAM-ENGINE GOVERNORS.

---

The Schedule referred to in these Letters Patent and making part of the same.

---

*To all whom it may concern:*

Be it known that I, WILLIAM ASHBY, of Timber township, Peoria county, in the State of Illinois, have invented an Improved Governor and Indicator for Steam-Engines; and I hereby declare the following to be a full and exact description thereof, reference being had to the accompanying drawings, forming part of this specification.

The nature or essence of my invention consists in supporting the shaft, which takes its motion from a centrifugal governor, upon an adjustable bearing, so that it may be raised or lowered while the engine is in motion, and may thus be set to give a high or low rate of speed, as required; also, in arranging a lever provided at one end with a pin working in a grooved collar on the rod or shaft that communicates the action of the governor to the steam-valve, in order that the opposite end of the lever may show, by an index or scale, when the steam is rising or falling, and arranging, on said lever, projections to strike a bell or bells, the lowermost bell to give notice when the engine is about to diminish its speed, and the uppermost bell to give notice when the steam is considerably higher than the engine requires.

In the following more particular description of my improved governor, which I call "The Excelsior Steam-Governor and Indicator," I shall refer to the drawings hereinbefore mentioned, of which—

Figure 1 is a side elevation.

Figure 2, a transverse sectional elevation, at the line z z on fig. 1.

Figure 3 is a top view of the adjusting-beam or lever, with parts attached to the same.

The frame A supports and holds the different parts of the mechanism employed in the governor.

B B are centrifugal balls, suspended on the arms C C, pivoted in the head D, fixed on the shaft E, this shaft receiving motion from the engines through the bevel-gear at F and the shaft G, which may be turned by a belt on the pulley H, or otherwise.

The sliding collar I, on the shaft E, is connected to the arms C C by the rods or straps J J, pivoted at both ends, and is provided with two friction-wheels or flanges, either of which may come in contact with the wheel K, placed between them on the shaft L, but set so far apart that when one is in contact with K, the other will be clear of it.

The shaft L will therefore be turned in one direction, or the opposite, according as the rising or falling of the collar I may bring its lower or upper flange in contact with the wheel K.

The shaft L has on it a spiral thread or worm, N, working in the teeth of the wheel O, arranged as a nut on the screw-rod or shaft P, so as to raise or depress the rod P, according to the direction in which the shaft L is turned.

The lower end of the rod P may be connected to the steam-supply valve by any of the usual and well-known modes of connection, or by means of the lever W, pivoted upon the stand S.

Now, if the motion of the engine, communicated to the shaft E and balls B, shall become rapid enough to cause the balls to swing out by the centrifugal force generated, the sliding collar I will be raised, and its lower flange brought in contact with the wheel K, so as to turn the shaft L, and thus give motion to the rod P; but if, on the other hand, the speed slackens, so that the balls B tend to fall or collapse, the collar I will be depressed, and its upper flange brought in contact with the wheel K, and the shaft L will be turned in the opposite direction to that given in the former case, and a corresponding movement given to the rod P, and thus the steam-supply valve may be opened wider or shut closer, as required, to give, as nearly as may be, a uniform motion to the engine and machinery.

The lever or beam R is pivoted at one end upon the frame A, while its opposite end is arranged to traverse vertically in a bracket on a post of the frame A, being raised or lowered, as required, by means of the nut a on the screw-rod v, said nut and rod being held by the stand b, projecting from the frame A.

The stand c on the lever R holds the nut-wheel O, and the arm d on the same supports the bearing of the shaft L, and by means of the nut a, therefore, which raises or lowers the end of the lever R, the shaft L and wheel K may be adjusted, so as to place the wheel K at such a point of elevation as will secure the required rate of speed, whether high or low; for it is evident that if the wheel K be raised, the balls B must receive a more rapid motion before the collar I will be raised far enough for its lower flange to act upon the wheel K, so as to give motion to the rod P, and thus check the supply of steam, and that if the wheel K be depressed, a lower rate of speed will produce the same effect. In this way, then, the governor may be adjusted to secure uniformity in the rate of speed, whether a high or low rate be required, and the rate of speed may at any time be changed by raising or lowering the lever R, without its being necessary to stop the engine or machinery.

The lever e is pivoted upon a block fastened to the frame A, and has a pin projecting into the groove in the collar f, on the rod P, so that the rising and falling of the rod P, and consequently the opposite end of the lever e, projecting through the index-scale g, will indicate when the steam is rising or falling, the speed being the same, while the indicator traverses from one end of the scale to the other, or back again, until the steam is all on or off, as the case may be.

The strikers h h, on the block i, fastened on the lever e, by coming in contact with the bell j or j', as the case may be, will give notice, in the one case, when the speed is about to diminish, and, in the other case, to give notice when the steam is about to escape through the safety-valve.

The plate $g$ may have a scale, $k$, on which figures may be placed, indicating any given position of the finger.

The thumb-latch $n$, situated on the block Y, through which the rod P passes down to the steam-valve, may be sprung out of the groove in the rod P, so as to allow the rod P to be turned by the hand-wheel X in starting or stopping the engine.

1. I claim the combination and arrangement of the lever R, screw-rod $v$, arm $d$, shaft L, and stand $c$, substantially as set forth.

2. I also claim the arrangement of the grooved collar $f$, on the rod P, lever $e$, index-scale $g$, strikers $h$ and $h'$, and bells $j$ and $j'$, substantially as described.

WILLIAM ASHBY.

Witnesses:
ISAAC WHITEHOUSE,
JOS. W. HURST.